US012735987B2

(12) United States Patent
Brettschneider et al.

(10) Patent No.: US 12,735,987 B2
(45) Date of Patent: Sep. 15, 2026

(54) TURBOFAN ENGINE HAVING A LOW-PRESSURE TURBINE

(71) Applicant: MTU Aero Engines AG, Munich (DE)

(72) Inventors: Markus Brettschneider, Karlsfeld (DE); Roman Seiband, Todtenweis (DE); Petra Kufner, Poing (DE); Jens Truebenbach, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 19/032,175

(22) Filed: Jan. 20, 2025

(65) Prior Publication Data

US 2025/0179921 A1 Jun. 5, 2025

(30) Foreign Application Priority Data

Jan. 24, 2024 (DE) ......................... 102024101944.1

(51) Int. Cl.
*F01D 5/12* (2006.01)
*F01D 15/12* (2006.01)

(52) U.S. Cl.
CPC ............... *F01D 5/12* (2013.01); *F01D 15/12* (2013.01); *F05D 2220/36* (2013.01)

(58) Field of Classification Search
None
See application file for complete search history.

(56) References Cited

U.S. PATENT DOCUMENTS 4,080,102 A 3/1978 Schwab et al.
4,626,174 A 12/1986 Sato et al.
4,968,216 A 11/1990 Anderson et al.
6,358,012 B1 3/2002 Staubach et al.
6,666,654 B2 12/2003 Olhofer et al.
6,682,301 B2 * 1/2004 Kuhne ...................... F01D 1/04 415/181
7,175,393 B2 2/2007 Chandrakar et al.
9,909,505 B2 * 3/2018 Gallagher ................. F02K 3/06
11,162,374 B2 11/2021 Taniguchi et al.
2007/0033802 A1 2/2007 McKeever et al.
2012/0096830 A1 4/2012 Manoharan et al.
2013/0315726 A1 11/2013 Ristau et al.
2018/0100399 A1 4/2018 Peeren et al.
2020/0182074 A1 6/2020 Taniguchi et al.
2020/0291865 A1 9/2020 Howarth et al.
(Continued)

FOREIGN PATENT DOCUMENTS

CN 104420888 B 4/2016
CN 104533537 B 8/2016
(Continued)

OTHER PUBLICATIONS

Simonassi et al., "An Experimental Test Case for Transonic Low-Pressure Turbines—Part I: Rig Design, Instrumentation, and Experimental Methodology", Turobmachinery Technical Conference and Exposition; Jun. 13-17, 2022 (Year: 2022).*
(Continued)

*Primary Examiner* — Courtney D Heinle
*Assistant Examiner* — Danielle M. Christensen
(74) *Attorney, Agent, or Firm* — Davidson Kappel LLC

(57) ABSTRACT

A turbofan engine having a low-pressure turbine that has at last four stages, at least one of the four stages having a transonic airfoil cascade is provided.

21 Claims, 5 Drawing Sheets

(56) References Cited

U.S. PATENT DOCUMENTS

| | | | | |
|---|---|---|---|---|
| 2021/0189971 | A1* | 6/2021 | Gaskell | F02C 7/36 |
| 2023/0028763 | A1 | 1/2023 | Pixton | |
| 2023/0059927 | A1 | 2/2023 | Johnson et al. | |

FOREIGN PATENT DOCUMENTS

| | | | |
|---|---|---|---|
| CN | 105507955 | B | 3/2017 |
| CN | 115263436 | A | 11/2022 |
| CN | 115270341 | A | 11/2022 |
| CN | 115288850 | A | 11/2022 |
| CN | 113836633 | B | 12/2022 |
| CN | 115653693 | A | 1/2023 |
| DE | 112018003076 | T5 | 3/2020 |
| DE | 102020104625 | A1 | 9/2020 |
| EP | 1300547 | A2 | 4/2003 |
| EP | 1152122 | B1 | 8/2005 |
| EP | 1300547 | B1 | 4/2013 |
| EP | 2762710 | A1 | 8/2014 |
| EP | 2857655 | A1 | 4/2015 |
| EP | 3043058 | A1 | 7/2016 |
| EP | 3051100 | A1 | 8/2016 |
| EP | 3181884 | A1 | 6/2017 |
| EP | 2666963 | B1 | 11/2017 |
| EP | 3591205 | A1 | 1/2020 |
| EP | 3670889 | A1 | 6/2020 |
| EP | 3674220 | A1 | 7/2020 |
| EP | 3708818 | A1 | 9/2020 |
| EP | 3708819 | A1 | 9/2020 |
| EP | 3741982 | A1 | 11/2020 |
| EP | 3274558 | B1 | 3/2021 |
| EP | 3919733 | A1 | 12/2021 |
| FR | 3100836 | B1 | 9/2021 |
| FR | 3128244 | A1 | 4/2023 |
| JP | H0689646 | B2 | 11/1994 |
| JP | 2013245680 | | 6/2016 |
| WO | WO2023061796 | A1 | 4/2023 |

OTHER PUBLICATIONS

Thunder Said Energy, "Gas Turbines: Operating Parameters?"; https://thundersaidenergy.com/downloads/gas-turbines-operating-parameters/; available Mar. 19, 2023 courtesy of WaybackMachine.com (Year: 2023).*

Mishra et al.; "Failure Analysis of an Un-cooled Turbine Blade in an Aero Gas Turbine Engine"; Engineering Failure Analysis, vol. 79, pp. 836-844; Sep. 2017 (Year: 2017).*

Schmitz J. T. et al: "Highly Loaded Low-Pressure Turbine: Design, Numerical, F02K3/06 and Experimental Analysis", Journal of Propulsion and Power., Bd. 32, Nr. 1, Jan. 1, 2016 (Jan. 1, 2016) , Seiten 142-152, XP093279020, ISSN: 0748-4658, DOI: 10.2514/1.B35334 URL:https://new-api.aerodynamic-solutions.com/storage/7/Highly-loaded-low-pressure-turbine-Design,-numerical,-and-experimental-analysis_12Oct15.pdf.

* cited by examiner

TURBOFAN ENGINE HAVING A LOW-PRESSURE TURBINE

This claims priority to German Patent Application DE 102024101944.1 filed on Jan. 24, 2024 which is hereby incorporated by reference herein.

DESCRIPTION

Technical Field

The present invention relates to a turbofan engine having a low-pressure turbine.

Background Art

The present subject matter relates to a turbofan engine having a low-pressure turbine, whose blade rings are typically coupled to a fan via a gearbox. An engine of this type is also referred to as "geared turbofan (GTF) engine." During operation, the fan rotates at a lower speed than the low-pressure turbine (sometimes also referred to as "low-pressure turbine module") due to the gear reduction. The term "low-pressure turbine" as used herein refers to that section of the aircraft gas turbine of the turbofan engine which is downstream of (i.e., comes after) an upstream-most turbine module immediately downstream of the combustor in the direction of flow. The low-pressure turbine may drive a middle shaft and/or an innermost shaft of the turbofan engine.

SUMMARY OF THE INVENTION

The present invention addresses the technical problem of providing an advantageous turbofan engine having a low-pressure turbine.

The present invention provides a turbofan engine. The low-pressure turbine thereof has at least four stages. At least one of the four stages has a transonic airfoil cascade, i.e., a transonic blade cascade and/or a transonic vane cascade. As will be discussed in detail below, a transonic airfoil cascade can be understood to be an airfoil cascade or airfoil ring in which, at least in some areas of an airfoil passage defined along the transonic airfoil cascade, the flow reaches velocities greater than or equal to a sonic velocity of a fluid flowing through the transonic airfoil cascade during operation.

The transonic design of the low-pressure turbine may, for example, be an expression of a modified or optimized work distribution in the engine, namely a work output that is proportionally shifted axially further toward the rear (i.e., in a downstream direction in relation to the working gas). All things considered, this can increase the efficiency of the turbofan engine for the same total work output, for example. In simplified terms, a modified work split within the turbofan engine from the high-pressure turbine into the low-pressure turbine is achieved while at the same time increasing the overall efficiency of the turbofan engine. Consequently, however, the flow velocities in the low-pressure turbine increase, which is why it is provided with one or more transonic airfoil cascade(s).

As an alternative to the low-pressure turbine with at least four stages, it may also have exactly three stages. At least two of these three stages each have a transonic airfoil cascade, i.e., at least one of a transonic blade cascade and a transonic vane cascade. In this case, too, the work output is shifted axially toward the rear (as explained above), thereby increasing the overall efficiency of the turbofan engine, the at least two transonic airfoil cascades accounting for the resulting higher flow velocities. In general, the transonic design can reduce any influence on the flow, for example, prevent significant additional acceleration or deceleration of the fluid flow near or in the supersonic range (both of which could be detrimental).

Preferred embodiments will be apparent from the dependent claims and the entire disclosure. In the description of the features, a distinction is not always specifically made between the different claim categories. For example, when a turbofan engine designed for a specific operation is described, such description should be read to refer also to a corresponding use or a corresponding method for operating the turbofan engine. Furthermore, information regarding the low-pressure turbine always also refers to the turbofan engine having such a low-pressure turbine.

When reference is made to a flow "during operation," this may refer, for example, to a design under take-off or, in particular, cruise conditions, i.e., to the Aerodynamic Design Point (ADP). Unless expressly indicated otherwise, the terms "axial," "radial," and "circumferential" as well as the corresponding directions (axial direction, etc.) are taken with respect to a centerline of the turbofan engine, which may coincide with an axis of rotation of the blade cascades. The terms "upstream" and "downstream" are taken with respect to a direction of flow of the working gas, i.e., of the hot gas flowing through the turbine.

In a preferred embodiment, a transonic airfoil of the transonic airfoil cascade has a suction side surface including an at least approximately linear portion that has an at least approximately linear profile when viewed in a sectional plane of the airfoil. The sectional plane of the airfoil is orthogonal to a stacking axis, which is obtained as a line connecting the centroids of area of the cross-sectional profiles, a respective centroid of area being taken in a respective sectional plane of the airfoil at the respective cross-sectional profile. With the at least approximately linear profile, any influence on the fluid flow at the suction side surface can be reduced (no additional acceleration and also no additional deceleration).

In a preferred embodiment, the at least approximately linear profile in the sectional plane of the airfoil extends over at least 10%, preferably 20%, of an axial width of the transonic airfoil (possible upper limits may be 60%, 50%, or 40%, or 30%). The axial width is taken as the axial chord length of the cross-sectional profile in the respective sectional plane of the airfoil.

In a preferred embodiment, the at least approximately linear portion extends radially over at least 10%, preferably at least 20%, particularly preferably at least 30% or 40%, of a radial length of the transonic airfoil. In the case of a linear portion with a radial extent that varies over its axial width, its maximum radial extent is taken as a basis, which maximum radial extent may be, for example, at the downstream end of the linear portion. In more detail, the radial extent and the radial length may be taken at the same axial position, for example in a section perpendicular to the centerline. If the suction side surface in this section also has a proportional extent in the circumferential direction (the airfoil is, for example, leaned), only the respective radial portion is taken as a basis.

In a preferred embodiment, the at least approximately linear profile has a curvature when viewed in the sectional plane of the airfoil, the curvature deviating from a straight line by at most 5%, preferably by at most 3% or at most 2%, particularly preferably by at most 1%. For illustration and further details, reference is made to the exemplary embodiment (see FIG. 3) and the associated description. Preferably, this maximum curvature criterion may be met at least at radial airfoil heights between 50% and 90% (0% is at the radially inner end, 100% is at radially outer end) in a respective sectional plane of the airfoil. Within the limits of usual technical accuracy, the at least approximately linear profile may also coincide with a straight line (in the sectional plane of the airfoil), i.e., may actually be a straight line. In general, the at least approximately linear profile may, for example, be matched to a compression shock occurring on the suction side due to the higher flow velocity, the straight shape being able to prevent (further) acceleration or deceleration of the fluid.

In a preferred embodiment, the linear portion in the sectional plane of the airfoil is located immediately adjacent a trailing edge radius or a trailing edge curvature of the transonic airfoil. In a simplified summary, the linear portion merges directly into the trailing edge portion; i.e., it extends, for example, tangentially to or into the trailing edge radius.

In an embodiment, a total area of the linear portion increases in the downstream direction, i.e., becomes larger, for example, from cascade to cascade or from stage to stage.

In preferred embodiments, at least or exactly two, at least or exactly three, or at least or exactly four stages of the low-pressure turbine have a transonic airfoil cascade. Moreover, in one embodiment, the low-pressure turbine has exactly four stages. Alternatively, exactly three stages may be provided, and each of the three stages may have a transonic airfoil cascade.

In a preferred embodiment, the stator vanes and/or the rotor blades are uncooled airfoils. In other words, the stator vanes and/or the rotor blades do not have any cooling channels, cooling openings, or the like, to reduce the temperature of the airfoil during operation by means of a fluid (e.g., air, water, or other fluids).

In a preferred embodiment, the "aspect ratio" of the stator vane or rotor blade, which defines the ratio of the height to the axial width of the stator vane or rotor blade, is greater than or equal to 5, preferably greater than or equal to 4, particularly preferably greater than or equal to 3.5. The height of the airfoil is the distance in the circumferential direction (i.e., about the axis of rotation of the airfoil cascade) between the "uppermost" and "lowermost" ends of the airfoil, and the axial width is the distance in the axial direction between the "forwardmost" and the "rearwardmost" ends of the airfoil. In contrast to strongly curved airfoils, airfoils which are rather flat in profile correspond with these aspect ratio values, which allows for improved control of the flow situation (acceleration, velocity).

In a preferred embodiment, the transonic design of the turbofan engine is configured such that, as a start, only the last, or, in other words, the downstream-most airfoil cascade (blade cascade) is a transonic airfoil cascade. Further, the immediately adjacent upstream airfoil cascades (vane and blade cascades) may then, by-and-by, also be transonic. Thus, blade cascades and vane cascades could then be transonic, alternately from the flow exit end toward the flow inlet. Such extension may be carried out airfoil cascade by airfoil cascade, or may directly involve several immediately adjacent airfoil cascades. Alternatively, non-adjacent airfoil cascades (vane and/or blade cascades) could have a transonic design.

The invention further relates to a use of low-pressure turbine in a herein-described turbofan engine, where the flow through the at last one transonic airfoil cascade is transonic.

BRIEF DESCRIPTION OF THE DRAWINGS

The invention will now be described in more detail with reference to an exemplary embodiment. The individual features may also be essential to the invention in other combinations within the scope of the other independent claims, and, as above, no distinction is specifically made between different claim categories.

In the drawings.

PREFERRED EMBODIMENT OF THE INVENTION

Figure 1:
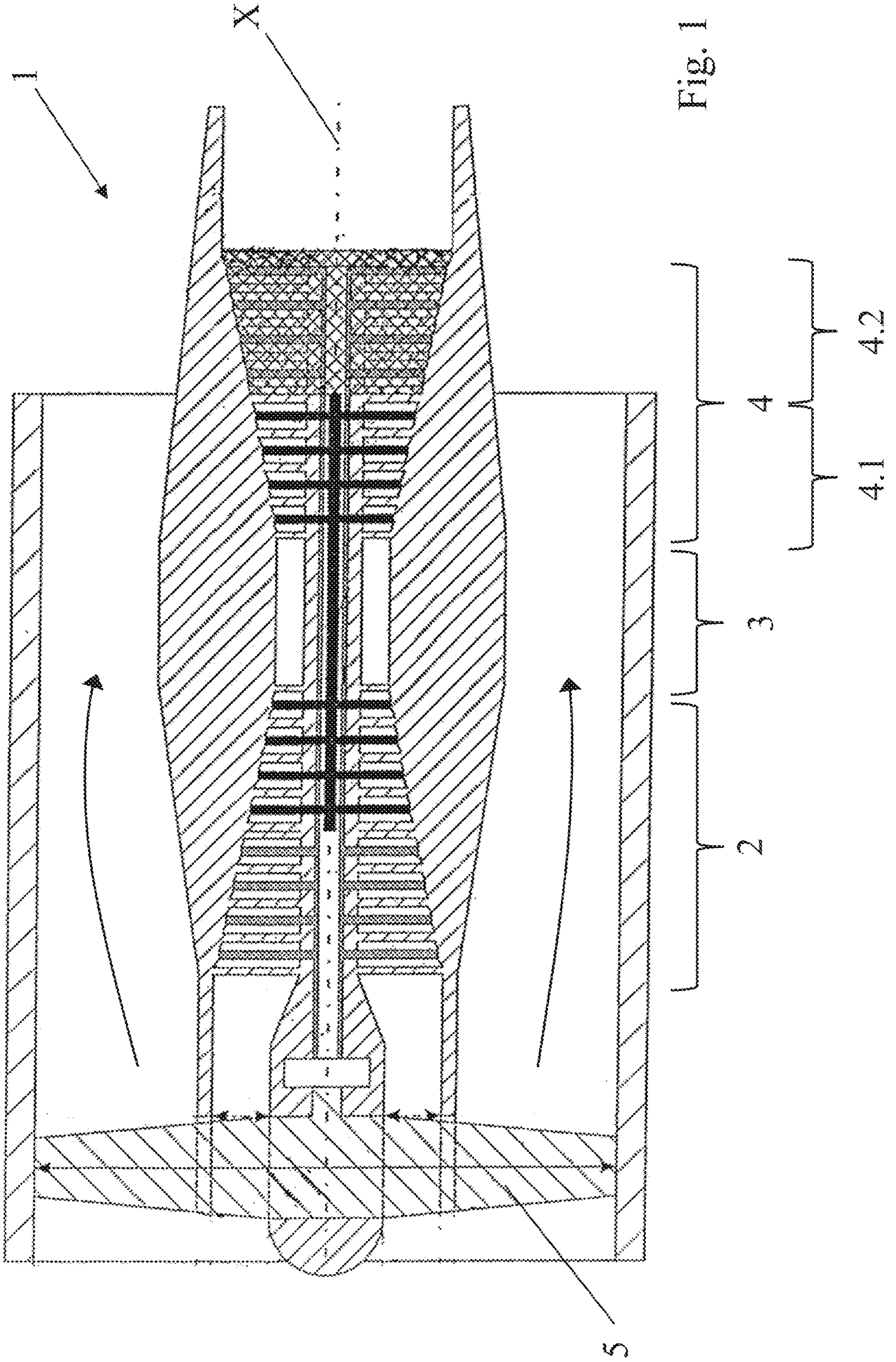
FIG. 1 is a schematic axial sectional view of a turbofan engine.

FIG. 1 shows a turbofan engine 1 in an axial sectional view along centerline X. The turbofan engine is functionally divided into a compressor 2, a combustor 3, and a turbine 4. Intake air is compressed in compressor 2. In combustor 3, fuel (e.g., kerosene) is mixed therewith, and this mixture is burned. In turbine 4, which is composed of a high-pressure turbine 4.1 and a low-pressure turbine 4.2, the hot gas is expanded and a portion of the energy is extracted from the hot gas (by movement of the rotors). This energy is used to drive the rotors of compressor 2 and of fan 5.

Figure 2:
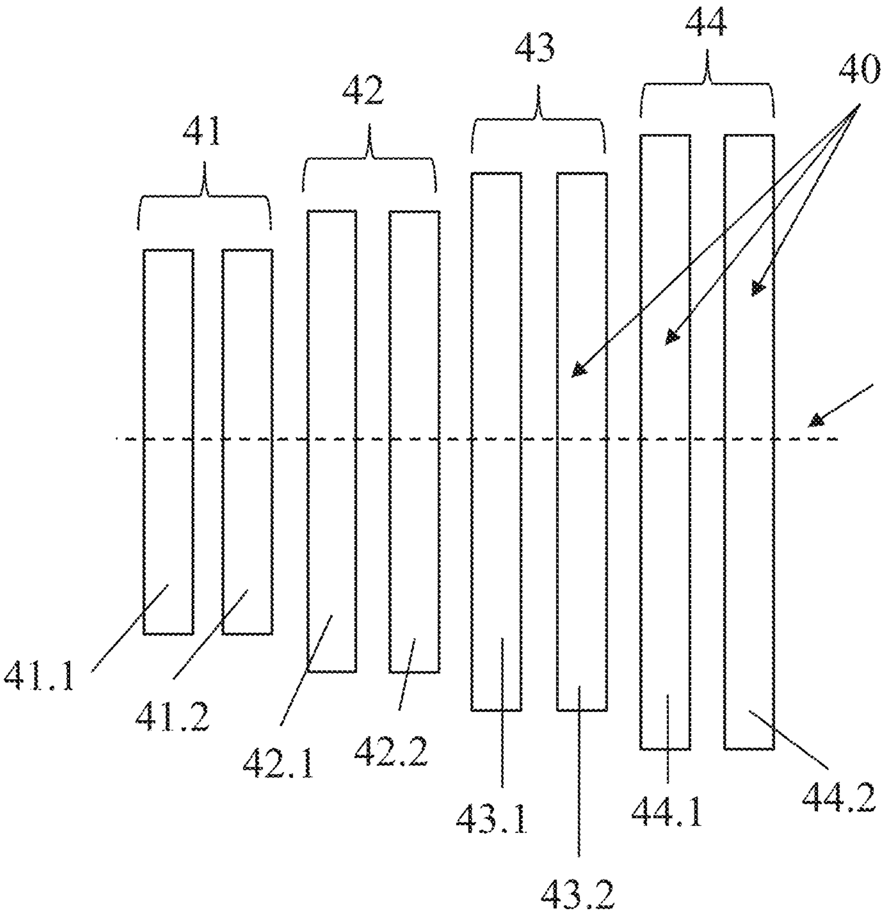
FIG. 2 is a schematic representation of a low-pressure turbine for a turbofan engine.

FIG. 2 shows, in schematic form, low-pressure turbine 4.2, namely four stages 41-44 in the present case; however, low-pressure turbine 4.2 includes at least three stages in total. At least one of the four stages 41-44 has a transonic airfoil cascade 40, several transonic cascades being referenced here by way of example. The transonic airfoil cascade may be both a vane cascade 41.1, 42.1, 43.1, 44.1 and a blade cascade 41.2, 42.2, 43.2, 44.2.

Figure 3A:
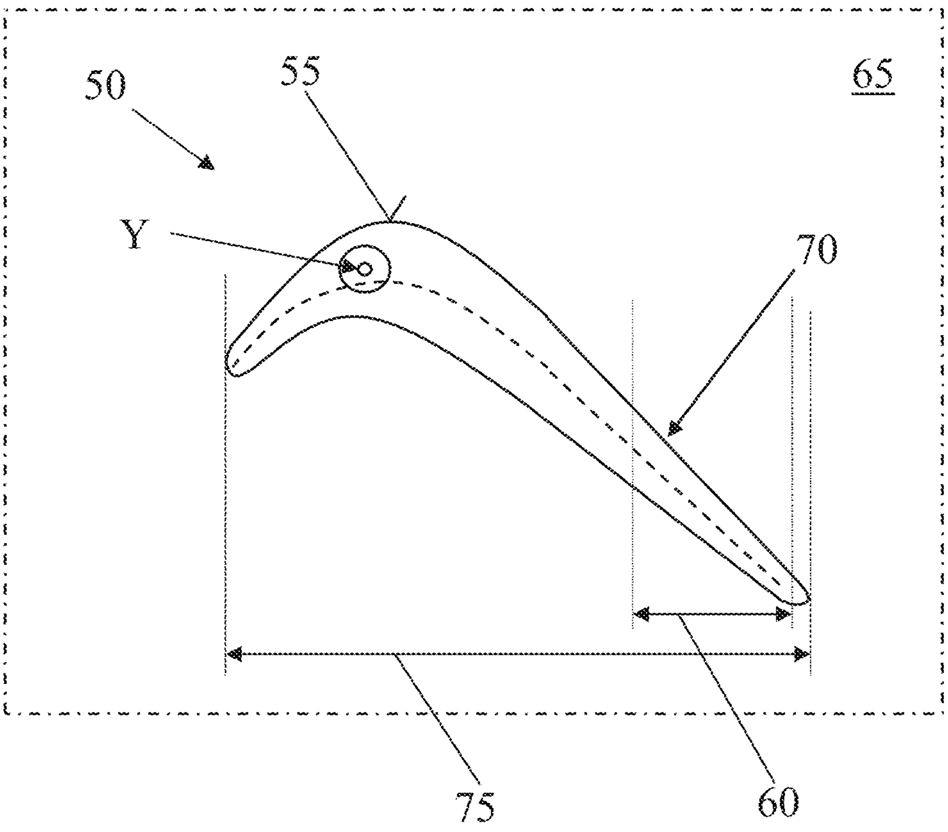
FIG. 3*a* is a sectional view through a transonic airfoil of a transonic airfoil cascade.

FIG. 3*a* shows a sectional view through a transonic airfoil 50 of such a transonic airfoil cascade 40 in a sectional plane of the airfoil, 65. This sectional plane of the airfoil, 65, is orthogonal to a stacking axis Y of transonic airfoil 50, which corresponds to a line connecting the centroids of area.

During operation, transonic airfoil 50 is exposed to a fluid flow and has a suction side (the region above transonic airfoil 50 in FIG. 3*a*) as well as a pressure side (the region below transonic airfoil 50 in FIG. 3*a*). On the suction side, transonic airfoil 50 has a suction side surface 55 with an at least approximately linear portion 60, which has an at least approximately linear profile 70 (i.e., a substantially straight shape) when viewed in the sectional plane of the airfoil, 65. In the present case, this at least approximately linear profile 70 extends over about 25% of an axial width 75 of transonic airfoil 50.

Figure 3B:
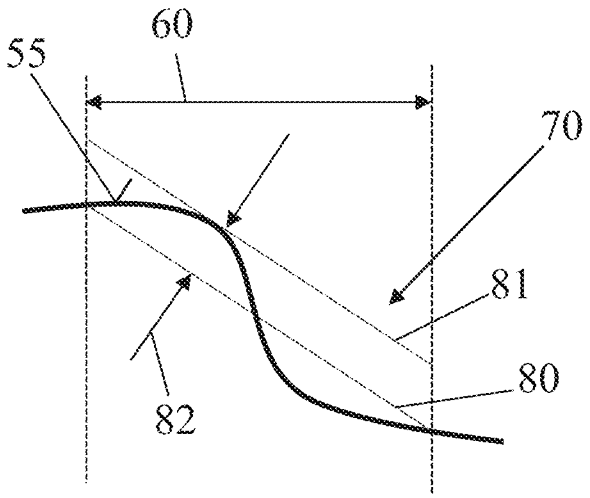
FIG. 3*b* is a view of a detail from FIG. 3*a;*

FIG. 3*b* shows a detail from FIG. 3*a* and illustrates the at least approximately linear profile 70. Again, an at least approximately linear portion 60 is considered, which extends over 25% of axial width 75 and whose axially rear end lies in the transition region to the trailing edge curvature. In this sectional view, a first straight line 80 is obtained as a straight connecting line between the start and end points that suction side surface 55 has in the at least approximately linear portion 60. A second straight line 81 is obtained as a tangent to suction side surface 55, this tangent being parallel to first straight line 80 and positioned on suction side surface 55 such that a distance 82 between straight lines 80, 81 becomes maximum.

In the context of the present disclosure, the terms “approximately linear portion” and “approximately linear profile” are understood to refer to a shape/profile where a quotient of distance 82 to axial width 75 (distance/axial width) is at most 5%, in the order given at least 3%, 2% or 1%, or differs by no more than this value from the respective quotient of 0% of a linear shape. This substantially straight extent of suction side surface 55 is not necessarily limited to the 25% of the axial width, but may, for example, also extend axially further forward (the 25% range is, however, taken as a basis for the consideration of the linearity and should be met at least there).

Preferably, the maximum deviation of 5% (of at most 3%, 2%, or 1%) is present at least at a radial airfoil height between 50% and 90%. However, the maximum deviation criterion may additionally also be met radially inwardly and/or outwardly of this range (50%-90%).

Figure 4:
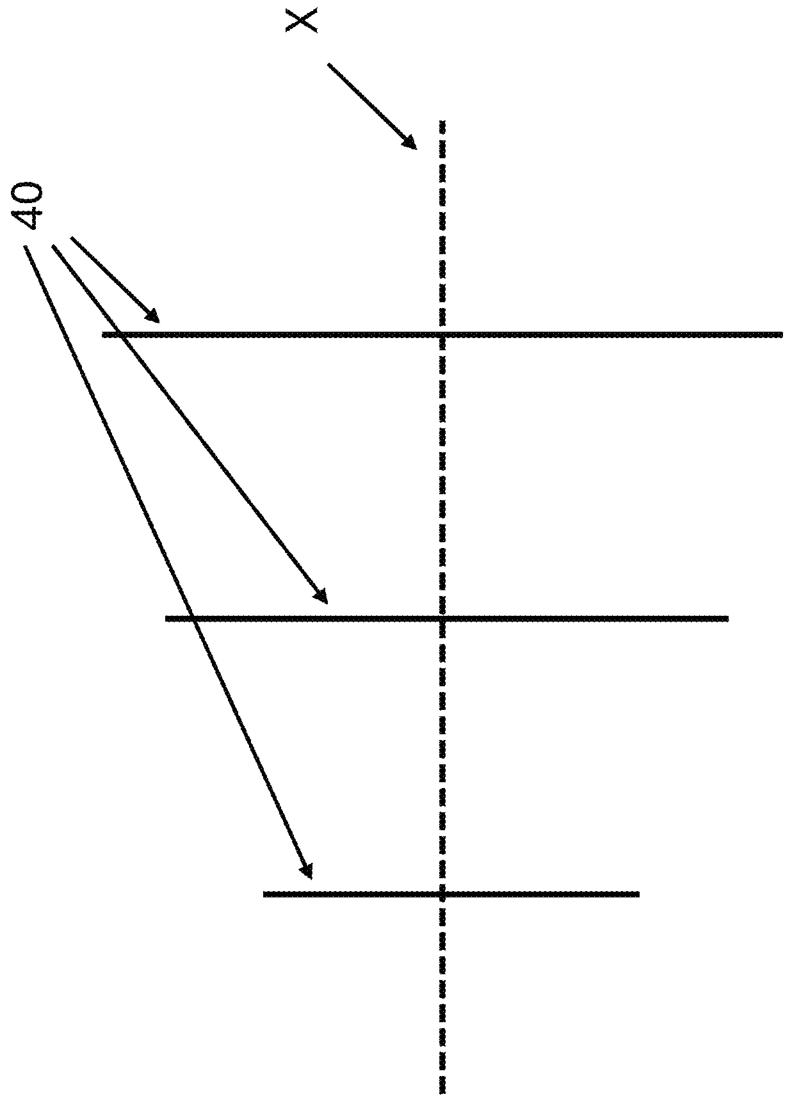
FIG. 4 is a schematic representation of further embodiment of a turbofan engine comprising three stages.

FIG. 4 shows a schematic representation of further embodiment of a low-pressure turbine comprising three stages. Each stage has an airfoil cascades 40. At least two of these three stages each have a transonic airfoil cascade.

LIST OF REFERENCE CHARACTERS

| | |
|---|---|
| Turbofan engine | 1 |
| Low-pressure turbine | 4.2 |
| Transonic airfoil cascade(s) | 40 |
| Stages | 1-44 |
| Vane cascades | 41.1-44.1 |
| Blade cascades | 41.2-44.2 |
| Transonic airfoil | 50 |
| Suction side surface | 55 |
| At least approximately linear portion (of the suction side surface) | 60 |
| Sectional plane of the airfoil | 65 |
| At least approximately linear profile (of the suction side surface) | 70 |
| Axial width (of the transonic airfoil) | 75 |
| First straight line | 80 |
| Second straight line | 81 |
| Distance between the straight lines | 82 |

What is claimed is:

1. A turbofan engine comprising:

a low-pressure turbine having at least four stages, at least one of the four stages having a transonic airfoil cascade, wherein the last downstream airfoil cascade is a transonic airfoil cascade and at least one of the airfoil cascades upstream from the downstream airfoil cascades is not transonic.

2. The turbofan engine as recited in claim 1 wherein the transonic airfoil cascade is a transonic vane cascade.

3. The turbofan engine as recited in claim 1 wherein the transonic airfoil cascade is a transonic blade cascade.

4. The turbofan engine as recited in claim 1 wherein a transonic airfoil of the transonic airfoil cascade has a suction side surface including a linear portion having a linear profile when viewed in a sectional plane of the airfoil.

5. The turbofan engine as recited in claim 4 wherein the linear profile in the sectional plane of the airfoil extends over at least 10% of an axial width of the transonic airfoil.

6. The turbofan engine as recited in claim 4 wherein the linear profile in the sectional plane of the airfoil extends radially over at least 10% of a radial length of the transonic airfoil.

7. The turbofan engine as recited in claim 4 wherein the linear profile has a curvature when viewed in the sectional plane of the airfoil, the curvature deviating from a linear shape by at most 5%.

8. The turbofan engine as recited in claim 4 wherein the linear portion in the sectional plane of the airfoil is located immediately adjacent a trailing edge radius or a trailing edge curvature of the transonic airfoil.

9. The turbofan engine as recited in claim 4 wherein a plurality of transonic airfoil cascades each have a respective transonic airfoil having a respective linear portion, wherein a respective total area of the respective linear portion increases from each of the plurality of airfoil cascades to a next airfoil cascade of the plurality of airfoil cascades in the downstream direction.

10. The turbofan engine as recited in claim 1 wherein at least two of the stages have a respective transonic airfoil cascade.

11. The turbofan engine as recited in claim 1 wherein at least three of the stages have a respective transonic airfoil cascade.

12. The turbofan engine as recited in claim 1 wherein at least four of the stages have a respective transonic airfoil cascade.

13. The turbofan engine as recited in claim 1 wherein the low-pressure turbine has exactly four stages.

14. The turbofan engine as recited in claim 1 wherein the turbofan engine is a geared turbofan engine having a fan and a gearbox, and wherein during operation, the fan rotates at a lower speed than the low-pressure turbine due to a gear reduction.

15. The turbofan engine as recited in claim 1 wherein at least one of the immediately adjacent upstream airfoil cascades to the last downstream airfoil cascade has a respective transonic airfoil cascade.

16. The turbofan engine as recited in claim 1 wherein only the last downstream airfoil cascade has the transonic airfoil cascades.

17. The turbofan engine as recited in claim 1 wherein an airfoil of the transonic airfoil cascade is an uncooled airfoil.

18. A method for operating the low-pressure turbine in the turbofan engine as recited in claim 1, the method comprising flowing a transonic flow through the transonic airfoil cascade.

19. A turbofan engine comprising:

a low-pressure turbine having at least four stages, at least one of the four stages having a transonic airfoil cascade, a transonic airfoil of the transonic airfoil cascade having a suction side surface including a linear portion having a linear profile when viewed in a sectional plane of the airfoil, the linear profile in the sectional plane of the airfoil extending radially over at least 10% of a radial length of the transonic airfoil.

20. A turbofan engine comprising:

a low-pressure turbine having at least four stages, at least one of the four stages having a transonic airfoil cascade, a transonic airfoil of the transonic airfoil cascade having a suction side surface including a linear portion having a linear profile when viewed in a sectional plane of the airfoil, the linear profile having a curvature when viewed in the sectional plane of the airfoil, the curvature deviating from a linear shape by at most 5%.

21. A turbofan engine comprising:

a low-pressure turbine having at least four stages, at least one of the four stages having a transonic airfoil cascade, a transonic airfoil of the transonic airfoil cascade having a suction side surface including a linear portion having a linear profile when viewed in a sectional plane of the airfoil, a plurality of transonic airfoil cascades each having a respective transonic airfoil having a respective linear portion, wherein a respective total area of the respective linear portion increases from each of the plurality of airfoil cascades to a next airfoil cascade of the plurality of airfoil cascades in the downstream direction.

* * * * *